(12) United States Patent
Rider et al.

(10) Patent No.: US 6,230,574 B1
(45) Date of Patent: May 15, 2001

(54) APPARATUS AND METHOD FOR MEASURING STRANGULATION EFFECT

(75) Inventors: Eugene D. Rider; Brian Rider, both of Westchester; Daniel Stool, Addison; Scott Milkovich, Glen Ellyn; Tao Xu, Woodridge, all of IL (US)

(73) Assignee: Risk Analysis & Management, Oak Brook, IL (US)

( * ) Notice: Subject to any disclaimer, the term of this patent is extended or adjusted under 35 U.S.C. 154(b) by 0 days.

(21) Appl. No.: 09/408,171

(22) Filed: Sep. 29, 1999

Related U.S. Application Data
(60) Provisional application No. 60/103,617, filed on Oct. 9, 1998.

(51) Int. Cl.[7] .................................................. G09B 23/32
(52) U.S. Cl. ............................................................. 73/865.1
(58) Field of Search .......................... 73/198, 714, 865.1, 73/865.3, 865.4, 866.4, 865.6; 434/262, 267–270, 274

(56) References Cited

U.S. PATENT DOCUMENTS

| | | | |
|---|---|---|---|
| 4,194,303 | * 3/1980 | Heller | 434/267 |
| 5,018,977 | * 5/1991 | Wiley et al. | 434/267 |
| 5,055,052 | * 10/1991 | Johnsen | 434/267 |

* cited by examiner

Primary Examiner—Robert Raevis
(74) Attorney, Agent, or Firm—Finnegan, Henderson, Farabow, Garrett & Dunner, L.L.P.

(57) ABSTRACT

An apparatus for measuring the effect of strangulation. The apparatus includes a model of a human having an artificial neck, and at least one sensor for measuring physical characteristics of the artificial neck during application of an applied force on the artificial neck. In one aspect, the model further includes a circulation system for circulating a fluid, and the at least one sensor includes a plurality of flow sensors to measure a flow of the fluid in the circulation system at predetermined locations and a plurality of pressure sensors to measure a pressure of the fluid in the circulation system at predetermined locations. In another aspect of the invention, the model includes a closed tube, and the at least one sensor includes a pressure sensor to measure the pressure of the air in the closed tube. The invention also includes a method for measuring the effect of strangulation on a model of a human. The method includes the steps of imparting an applied force on a neck portion of a model of a human, and measuring the physical characteristics of the neck portion during the application of the applied force.

19 Claims, 15 Drawing Sheets

APPARATUS AND METHOD FOR MEASURING STRANGULATION EFFECT

This application claims priority under 35 U.S.C. §119 based on U.S. Provisional Application Ser. No. 60/103,617, filed Oct. 9, 1998, the disclosure of which is incorporated by reference.

BACKGROUND OF THE INVENTION

1. Field of the Invention

This invention relates to an apparatus and method for assessing the strangulation hazards of products and apparel, and more particularly, to an apparatus and method for assessing strangulation hazards of these products and apparel on children.

2. Description of the Related Art

Currently, techniques for measuring the strangulation hazards of children's products and apparel are inadequate. Despite numerous safety requirements, over 150 children strangled to death between 1981 and 1991 as a result of products and apparel specifically intended for children's use. Children's products and apparel can pose serious strangulation hazards if not properly designed.

There have been some studies on the qualitative relationship between different types of childhood products and apparel, and the strangulations hazards they pose. However, there is no present method for quantitatively assessing the degree of strangulation hazard posed by children's products and apparel. Consequently, the potential risks associated with these products and apparel are not fully understood. Therefore, products and apparel are released in the market without proper testing of the risk of strangulation on the user. There is a need for an objectively-based test for assessing the level of strangulation hazards associated with a children's product.

SUMMARY OF THE INVENTION

The advantages and purposes of the invention will be set forth in part in the description which follows, and in part will be obvious from the description, or may be learned by practice of the invention. The advantages and purposes of the invention will be realized and attained by means of the elements and combinations particularly pointed out in the appended claims.

To attain the advantages and in accordance with the purposes of the invention, as embodied and broadly described herein, the invention includes an apparatus for measuring the effect of strangulation. The apparatus comprises a model of a human having an artificial neck, and at least one sensor for measuring physical characteristics of the artificial neck during application of an applied force on the artificial neck.

In another aspect, the model further includes a circulation system for circulating a fluid, and the at least one sensor includes a plurality of flow sensors to measure a flow of the fluid in the circulation system at predetermined locations and a plurality of pressure sensors to measure a pressure of the fluid at predetermined locations.

In a further aspect of the invention, the model includes a closed tube, and the at least one sensor includes a pressure sensor to measure the pressure of the air in the closed tube.

In a yet further aspect of the invention, the invention includes a method for measuring the effect of strangulation on a model of a human. The method comprises the steps of imparting an applied force on the neck portion of the model and measuring the physical characteristics of the neck portion during the application of the applied force on the neck portion.

In another aspect, the invention includes a method of manufacturing an artificial human neck. The method includes the steps of: producing an artificial carotid artery and artificial jugular vein by forming a mandrel by molding a first castable liquid material, placing the mandrel in a vein or artery mold, pouring a second castable liquid material around the mandrel inside the vein or artery mold to form the vein or artery, and heating the mold to slightly above the melting temperature of the mandrel to remove the mandrel from the vein or artery; producing an artificial spine and artificial muscle tissue surrounding the artificial spine; and producing an artificial trachea and artificial fat tissue surrounding the artificial trachea.

In a further aspect, the invention includes a method of manufacturing an artificial human neck. The method includes the steps of producing an artificial spine and muscle tissue surrounding the artificial spine, producing an artificial fat tissue, and inserting a closed tube inside the artificial fat tissue.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

In accordance with the present invention, an apparatus for measuring the effect of strangulation is provided. The apparatus generally comprises a model of a human having an artificial neck and artificial blood circulation system, and a plurality of sensors for measuring physical characteristics of the artificial neck during application of a strangulation force on the artificial neck.

Figure 1:
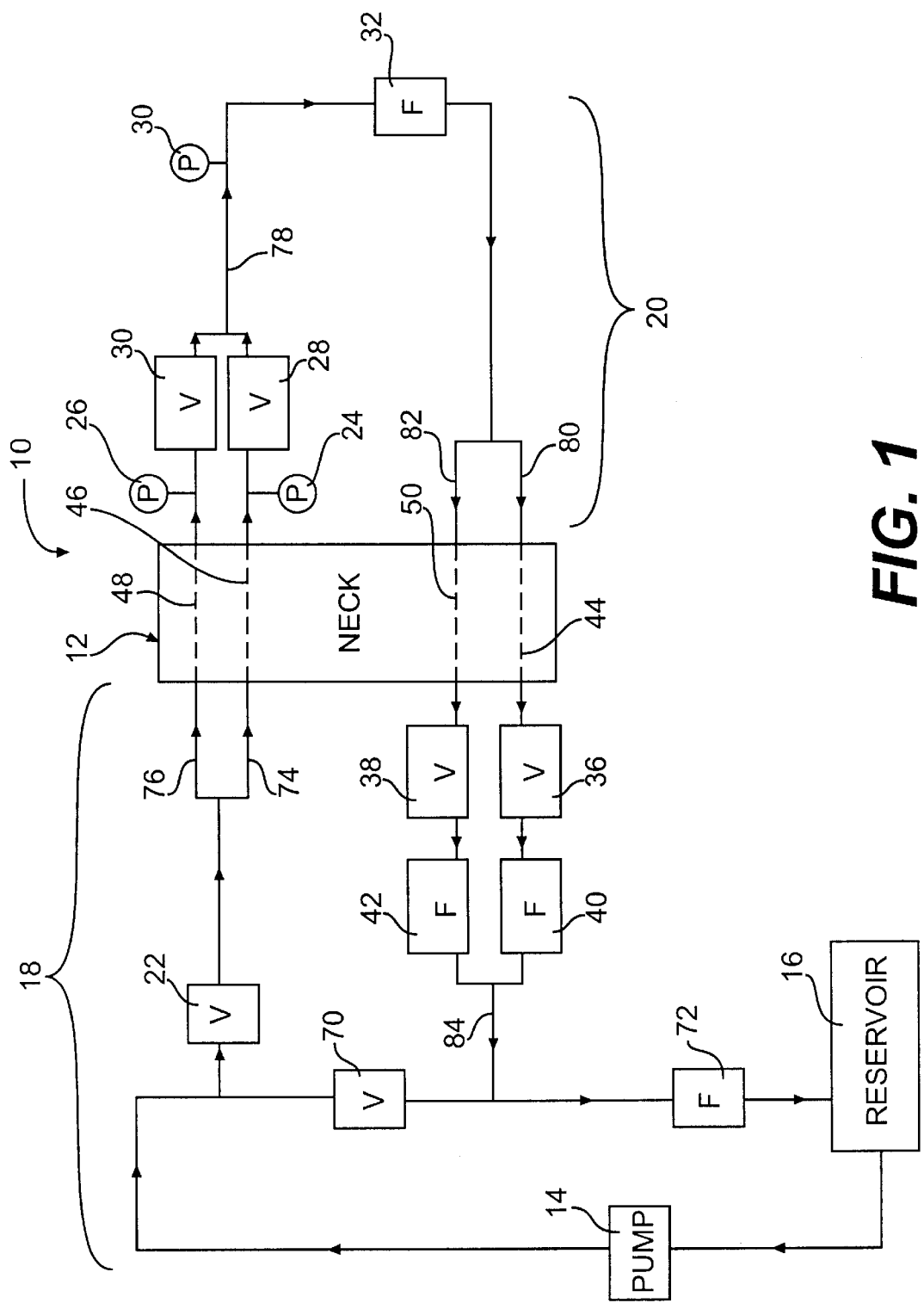
FIG. 1 is a schematic diagram of an apparatus for measuring the effect of strangulation according to a first embodiment of the invention.

FIG. 1 illustrates a general schematic of the apparatus, the details of which will be disclosed in the accompanying drawings and remainder of the specification. The apparatus 10 measures the effect of strangulation on a model of a human. The apparatus is designed to be similar in physical properties to an actual child's body and to respond to strangulation in a way representative of the way the actual human body responds. The schematic of FIG. 1 measures ligature strangulation, strangulation due to closure of the veins and/or arteries that provide blood to the head through the neck. When a person experiences ligature strangulation, injury or death may occur due to a lack of blood flow into or out of the head.

In accordance with the present invention, the apparatus includes a model of a human having an artificial neck and an artificial circulation system for circulating a fluid. As embodied herein and shown in FIG. 1, apparatus 10 includes an artificial fluid circulation system for circulating a fluid similar to human blood. The blood circulation system includes pump 14. Pump 14 is a diaphragm pump which closely models the human heart. The pressure developed from pump 14 circulates the artificial blood in the circulation system. The blood circulation system includes a reservoir 16 in which quantities of artificial blood accumulate. Reservoir 16 may be any vessel which can hold a sufficient quantity of artificial blood. The blood circulation system further includes a large amount of tubing for connecting the various valves, flow meters, pressure sensors and other parts.

Figure 2:
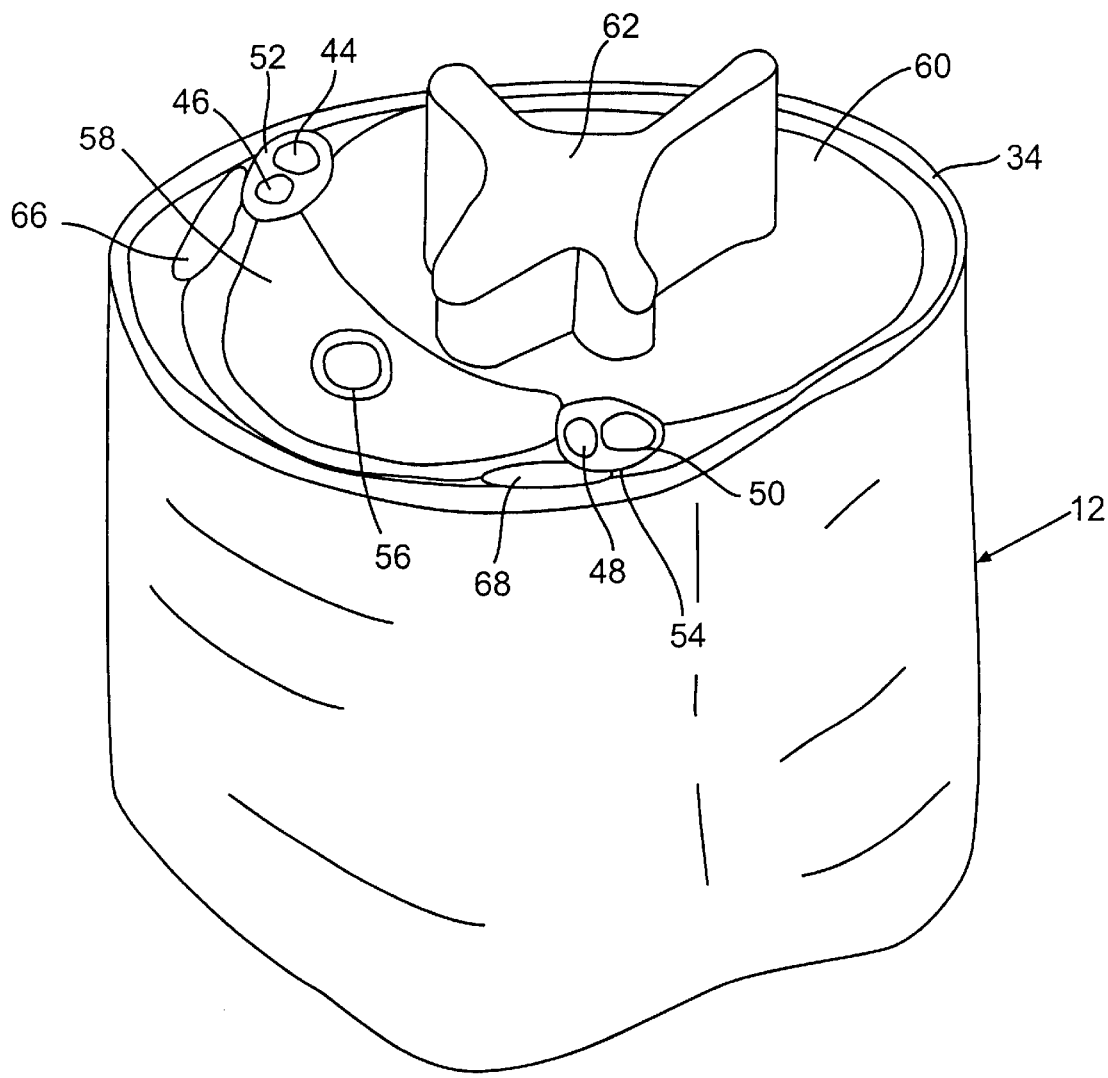
FIG. 2 is a perspective view of an artificial neck according to the first embodiment of the invention.
Figure 3:
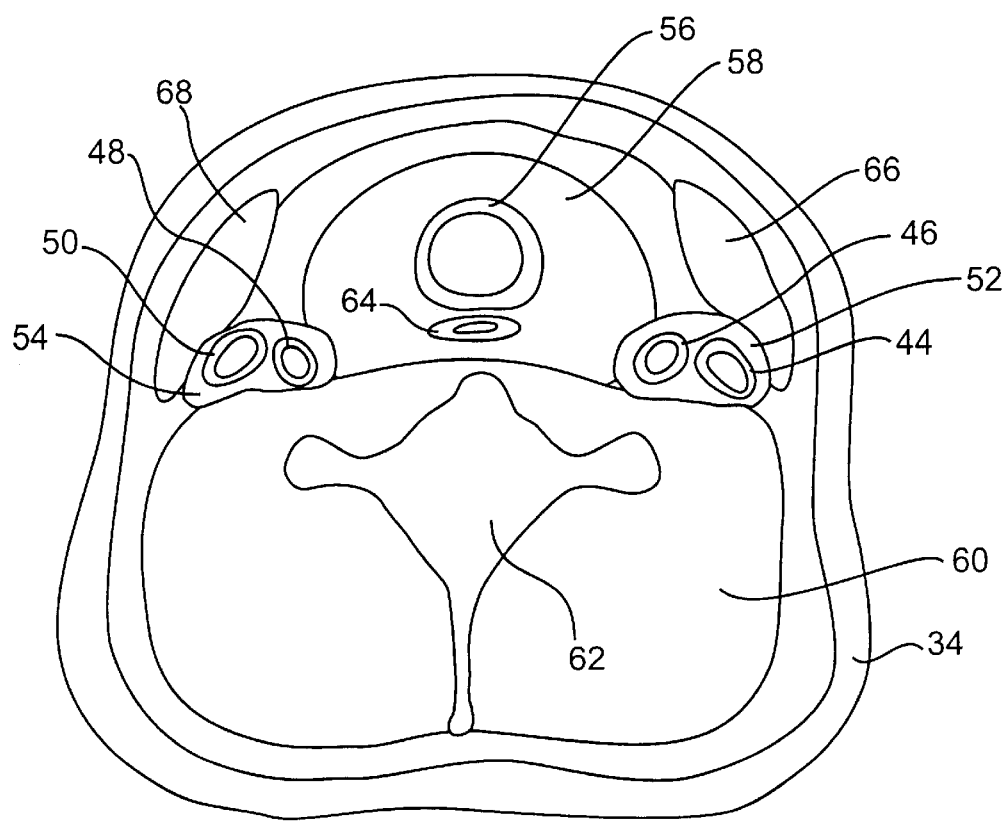
FIG. 3 is a top view of the artificial neck of FIG. 2 with slight variations.

The model of a human includes an artificial neck. As embodied herein and shown in FIGS. 1–3, apparatus 10 includes artificial neck 12. Neck 12 is designed to closely model the neck of an ordinary human child, and is located between the head portion 20 and body portion 18 of the model. Neck 12 includes right and left artificial jugular veins 44 and 50. Artificial blood returns to the body portion 18 from the head portion 20 through the jugular veins 44 and 50. The neck also includes right and left artificial carotid arteries 46 and 48 located immediately adjacent the right and left jugular veins, respectively. The blood enters the head portion 20 from the body portion 18 through the carotid arteries. As shown in FIGS. 2–3, the right jugular vein 44 and right carotid artery 46 are located within an artificial right carotid sheath 52. The left jugular vein 50 and left carotid artery 48 are located within an artificial left carotid sheath 54. The jugular veins and carotid arteries are preferably made out of silicone, however any other suitable material is acceptable. The method of making the veins and arteries, and the material used to make the veins and arteries, will be discussed later.

The artificial neck 12 further includes an artificial spine 62 as shown in FIGS. 2–3. Artificial spine 62 is surrounded by artificial muscle tissue 60. The neck 12 further includes an artificial trachea 56 which is surrounded by artificial fat tissue 58. The neck 12 further includes sternocleidomastoid muscles 66 and 68 located adjacent the right and left carotid sheaths 52 and 54, respectively. The components of the neck are contained within a skin layer 34, as shown in FIGS. 2–3.

The method and materials for making the spine, muscle tissue, trachea, fat tissue, and sternocleidomastoid muscles will be discussed later. FIG. 3 shows a top view of a neck 12 which is slightly different than the neck shown in FIG. 2. The neck 12 of FIG. 3 includes the additional provision of an artificial esophagus 64 located adjacent the trachea 56. It should be understood that additional body parts can be added to the artificial neck in order to increase the accuracy of modeling. These additional body parts may also be simulated in order to perform more accurate computer modeling.

Figure 4:
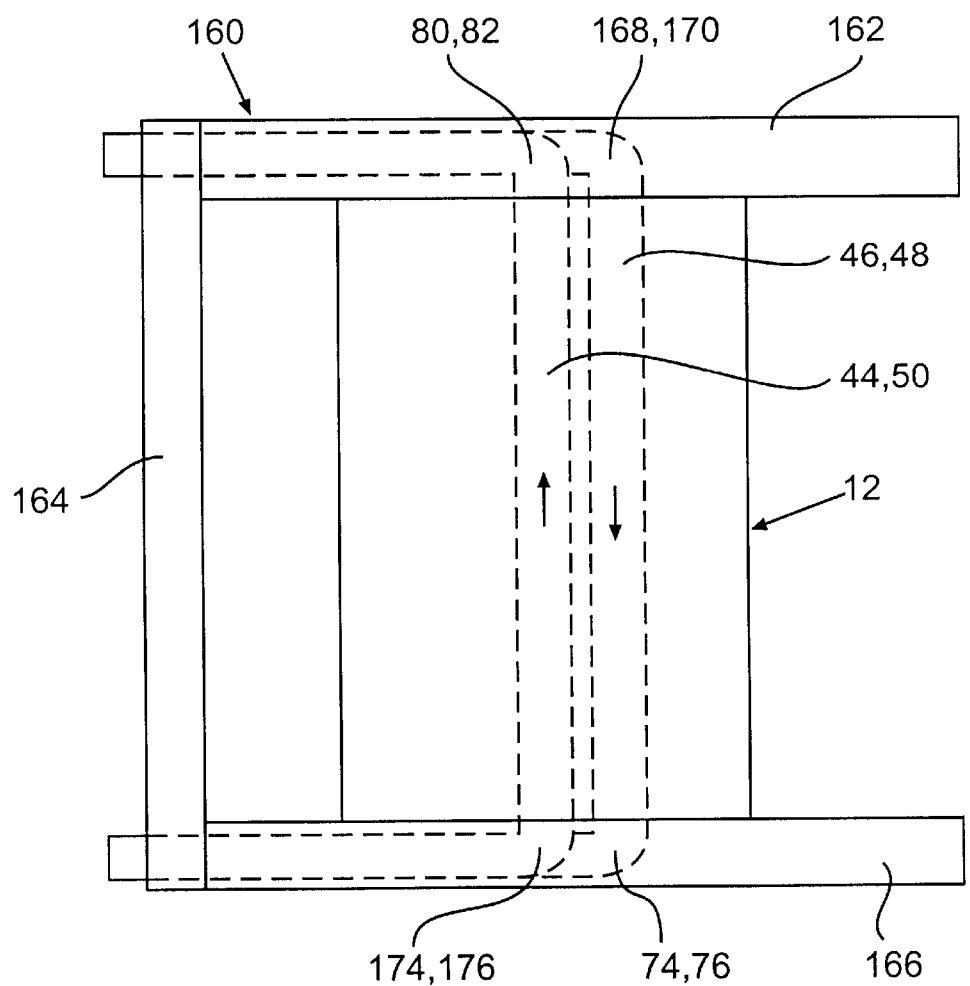
FIG. 4 is a side view of a support frame for the neck of FIG. 2.
Figure 5:
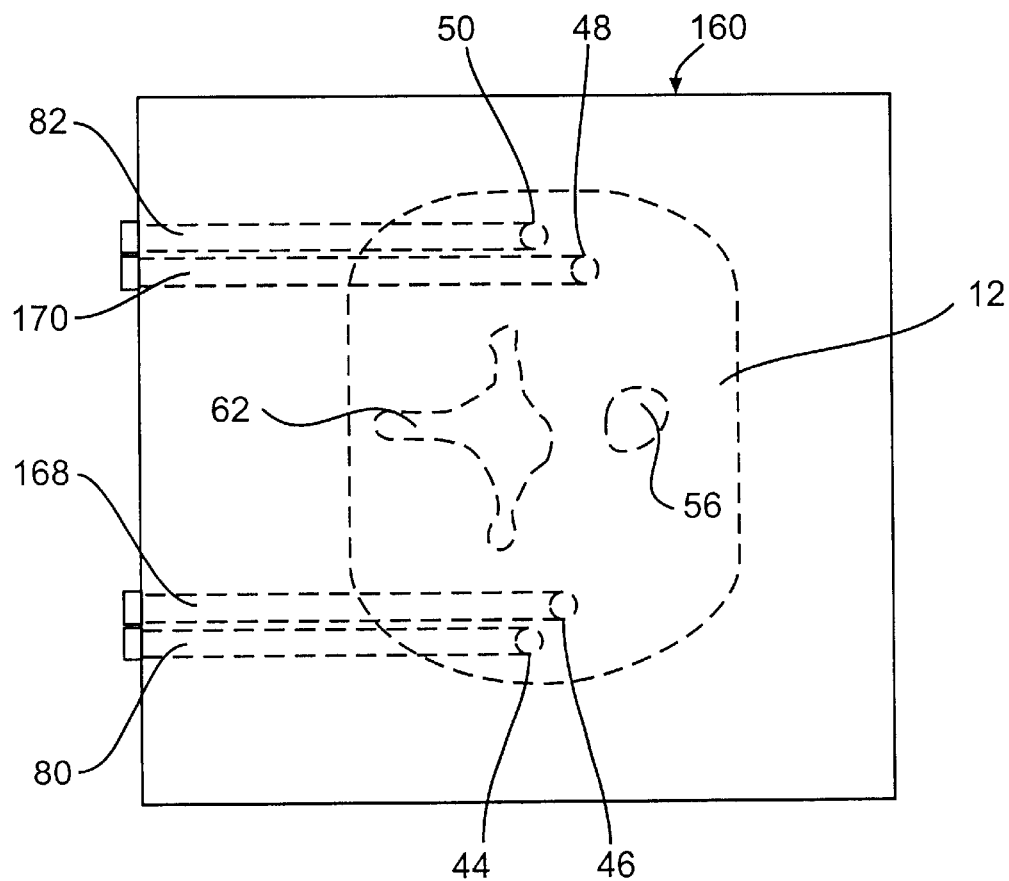
FIG. 5 is top view of the support frame of FIG. 4.

The artificial neck is typically positioned in a support frame, as shown for example in FIGS. 4–5. As shown in FIGS. 4–5, artificial neck 12 is positioned in a support frame 160. Support frame 160 includes top wall 162, side wall 164, and bottom wall 166. The walls are typically made out of plexiglass so that the fluid channels described below can be readily seen by an operator. The neck is positioned so the top surface of the neck abuts the top wall 162 of the support frame, and the bottom surface of the neck abuts the bottom wall 166 of the support frame, as shown in FIG. 4. A seal is formed between the top wall 162 and the top surface of the neck, and between the bottom wall 166 and the bottom surface of the neck. The seal prevents leakage of the artificial blood.

Artificial blood is delivered to the right and left artificial carotid arteries 46 and 48 via right and left carotid branches 74 and 76, respectively, which pass through the bottom wall 166 of the frame. The blood then flow upwards through the neck via right and left carotid arteries 46 and 48 and exits the neck and the frame through blood exit channels 168 and 170 and subsequently flows to the head portion. Blood returning to the body portion from the head portion enters the frame through right and left jugular branches 80 and 82, flows downward through the neck via right and left jugular veins 44 and 50, respectively, and exits the neck and frame through blood exit channels 174 and 176 and subsequently flows to the body portion. The right and left carotid branches 74 and 76, and blood exit channels 174 and 176 cannot be seen in FIG. 5 because FIG. 5 is a top view. FIGS. 4–5 show the preferred design for the support frame, however, it should be understood that other types of support frames may be acceptable for use with the present invention.

In accordance with the present invention, the at least one sensor for measuring physical characteristics of the artificial neck during application of an applied force on the artificial neck includes a plurality of flow sensors to measure a flow of the fluid in the circulation system at predetermined locations and a plurality of pressure sensors to measure a pressure of the fluid at predetermined locations. In addition, the apparatus further includes a plurality of flow valves for regulating the pressure and amount of artificial blood circulating through the regions of the blood circulation system.

As embodied herein and shown in FIG. 1, the apparatus includes a head flow valve 22 for regulating the amount of artificial blood going to the neck via the carotid arteries 46 and 48 and consequently to the head portion 20. The apparatus further includes carotid artery pressure sensors 24 and 26 for measuring the pressures at the exit of the right and left carotid arteries 46 and 48, respectively. The carotid artery pressure sensors 24 and 26 are pressure transducers.

The pressure transducers are connected to displays for displaying the respective pressure readings. Alternately, the pressure sensors could be pressure gages, however, the use of a gage would preclude the display of the pressure readings on a display panel. The apparatus further includes right and left carotid artery valves 28 and 30. The valves are located in the carotid artery flow path immediately adjacent the right and left carotid pressure sensors 24 and 26. The apparatus further includes pressure sensor 30 for measuring the fluid pressure of the artificial blood in the head portion, and flow sensor 32 for measuring the artificial blood flow rate in the head portion. Head flow sensor 32 is a flow meter of the type generally used in the art.

The apparatus further includes jugular valves 36 and 38 for regulating the amount of artificial blood passing through each of the jugular veins 44 and 50, and corresponding jugular vein flow sensors 40 and 42. Jugular valve 36 and jugular vein flow sensor 40 correspond to the right jugular vein 44. Jugular valve 38 and jugular vein flow sensor 42 correspond to the left jugular vein 50. The apparatus further includes a body flow valve 70 for regulating the amount of artificial blood bypassing the carotid arteries and returning to the reservoir. The apparatus further includes a total flow sensor 72 for measuring the flow returning to the reservoir.

The operation of the apparatus will be described below. The artificial blood starts at reservoir 16 which functions as the main body cavity. Pump 14 pumps the blood from the reservoir. The blood flows through pump 14 and splits, as shown in FIG. 1. Some of the blood flows through head flow valve 22 and the remainder flows through body flow valve 70. The blood flowing through the body flow valve 70 represents the portion of blood in a human body that does not go to the head but instead returns to the body. The blood flowing through the head flow valve 22 splits into a right carotid branch 74 and a left carotid branch 76. The blood then enters the neck and flows through the right and left carotid arteries 46 and 48. After the blood exits the neck, pressure sensors 24 and 26 measure the fluid pressure of the right and left carotid arteries respectively. The respective amounts of flow between the right and left carotid arteries is controlled by the right and left carotid valves 28 and 30.

The blood which has been split between right and left carotid branches now joins at the main head flow line 78. The pressure of the blood flowing through the main head flow line 78 is then sensed by head flow sensor 30. The flow rate of the blood flowing through the main head flow line 78 is sensed by the head flow sensor 32.

The blood flowing through the head portion 20 in the main head flow line 78 then splits into a right jugular vein branch 80 and a left jugular vein branch 82. The blood flowing through the right jugular vein branch 80 flows through the right jugular vein 44, right jugular vein valve 36, and right jugular vein flow sensor 40. Right jugular vein flow sensor 40 senses the amount of blood flow through the right jugular vein 44. The blood flowing through the left jugular vein branch 82 flows through the left jugular vein 50, left jugular vein valve 38, and left jugular vein flow sensor 42. Left jugular vein flow sensor 42 senses the amount of blood flow through the left jugular vein 50. The right and left jugular vein valves 36 and 38 control the relative amount of flow for the respective jugular veins. The right and left jugular vein branches 80 and 82 then join at the main jugular return line 84. The blood flowing through the main jugular return line 84 joins with the blood flowing through the body flow valve 70 and flows to the total flow sensor 72. The blood completes the circuit by going to the reservoir 16, and then to the pump 14, where the above process starts again.

The above operation allows the operator of the apparatus (or a computer if the apparatus is controlled automatically) to take various pressure and flow measurements on the apparatus for a given product or piece of apparel. The operator of the apparatus applies a force to the neck by wrapping the product or apparel around the neck model and then measuring the applied force with a hand-held force gage. The applied force restricts passage of the artificial blood through the carotid arteries and jugular veins in the neck. The resulting changes in the pressure and flow readings can then be recorded and monitored. This information allows for quantification of the hazard presented by the product.

The amount of force applied to the neck by the product or apparel can also be varied for a given product or apparel. In addition, many different types of products and apparel can be tested with the apparatus of the present invention. Through this type of testing manufacturers are better able to design products with a lower risk of strangulation hazard.

The construction of the artificial neck will be described below. It is essential to design an artificial neck which closely simulates the physical properties and characteristics of an actual child's neck. The apparatus must be able to simulate the response of an actual child's neck to the application of a strangulation force of a variety of magnitudes and orientations. The materials used in the artificial neck must have properties very similar to human tissue. The size of the body parts must also be similar to that of an actual child's neck.

The first step in constructing the artificial neck was the study of the physical properties of an actual child's neck. Various calculations were made in order to calculate the material properties of the veins, arteries, muscle, spine, esophagus, trachea, and fatty tissue. Hardness measurements of various materials were taken in order to closely model the materials to that of an actual child's body.

The dimensions of the carotid artery and jugular vein of a typical child were calculated by studying an MRI scan of a child's neck. The artificial human neck is designed to have carotid arteries and jugular veins of the same size as a typical human child, as well as similar properties. Based on the MRI scan, the carotid artery was measured to have an inside diameter of 3.40 mm and a wall thickness of 0.50 mm. The jugular vein was measured to have an inside diameter of 5.8 mm and a wall thickness of 0.50 mm. The pressures found in the carotid artery are between 75 mm Hg (diastolic) and 125 mm Hg (systolic). The jugular vein pressures are approximately 5 to 10% of the pressures of the carotid artery. The artificial human neck was designed based on these measurements. It should be understood that these values are exemplary only.

Figure 6:
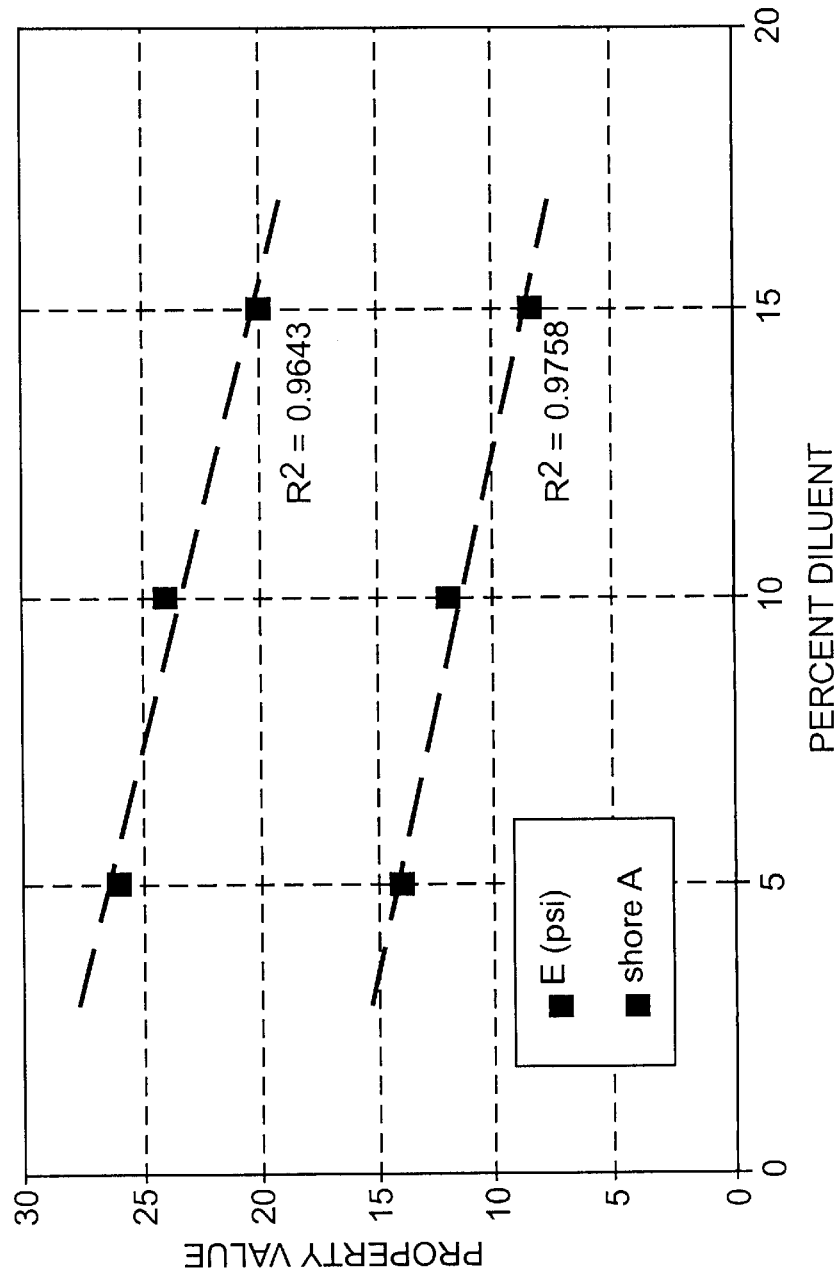
FIG. 6 is a graph of the elasticity and hardness of castable silicone with various percentages of diluent.

The procedure for making the veins and arteries will be described below. The veins and arteries are made via a molding process. A material must be selected that closely simulates the material properties of an actual child's veins and arteries, while also being capable of being molded to the appropriate size. After testing a variety of materials, it was decided that silicone V-1068 (Shin Etsu DMF 50 ViSil 1068 2 part castable silicone) formed the proper hardness and modulus of elasticity after casting. A diluent such as silicone oil diluent can also be added to the silicone V-1068 if necessary. FIG. 6 shows the property values for silicone V-1068 at various percentages of diluent. The top line represents the modulus of elasticity and the bottom line represents the hardness of the castable silicone. As indicated in FIG. 6, the elastic modulus and hardness decrease as the percentage of diluent is increased. Based on calculations and various references, the desired value for the modulus of elasticity for the carotid artery was found to be approximately 32 psi. The desired modulus of elasticity for the jugular vein was found to be approximately 18 psi. Therefore, based on the FIG. 6 graph, the carotid artery will preferably be 100% silicone V-1068 with no diluent, and the jugular vein will be V-1068 with 15–17.5% diluent. These values are exemplary only. Other materials such as silicone V-1067 are also acceptable alternatives to silicone V-1068.

Figure 7:
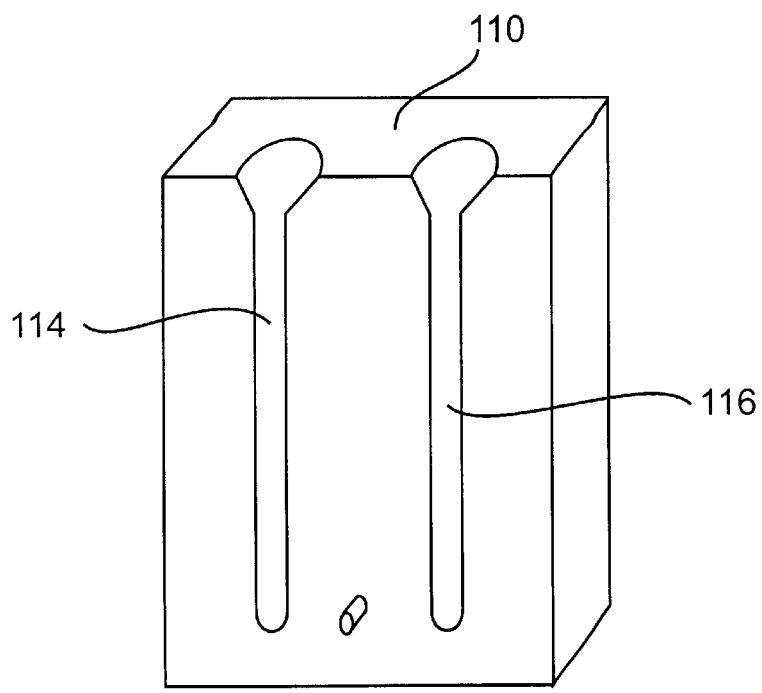
FIG. 7 is a perspective view of a mandrel mold half for molding the vein and artery mandrels, prior to assembly.
Figure 8:
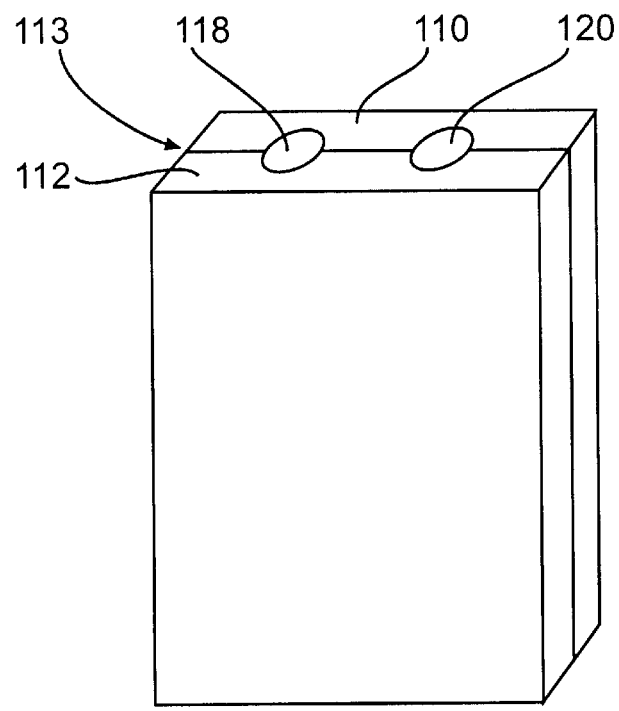
FIG. 8 is a perspective view of an assembled mandrel mold using the mandrel mold half of FIG. 7 and an additional mandrel mold half.

The first step in producing the veins and arteries is the production of the mandrels for the jugular vein and carotid artery. The mandrels have the shape of the inside of the veins and arteries. The mold for the mandrels is shown in FIGS. 7 and 8. In FIG. 7, mandrel mold half 110 includes a cavity 114 for the jugular vein mandrel and cavity 116 for the carotid artery mandrel. The mandrels are preferably made out of either "cerrobend" or "cerrolow-117" casting alloy material made of Cerro-Indium metal. These alloys are melted in a glass beaker on a hot-plate. The mandrel mold half 110 is mated with a second mandrel mold half 112 to form an assembled mandrel mold 113 as shown in FIG. 8. The liquid casting alloy is then poured into openings 118 and 120 on the top of assembled mandrel mold 113 in order to form the jugular vein mandrel and carotid artery mandrel, respectively. Once the casting alloy in the mandrel mold is solidified, the mandrels can be removed from the mold. The flash from the mandrels should also be removed if necessary.

Figure 9:
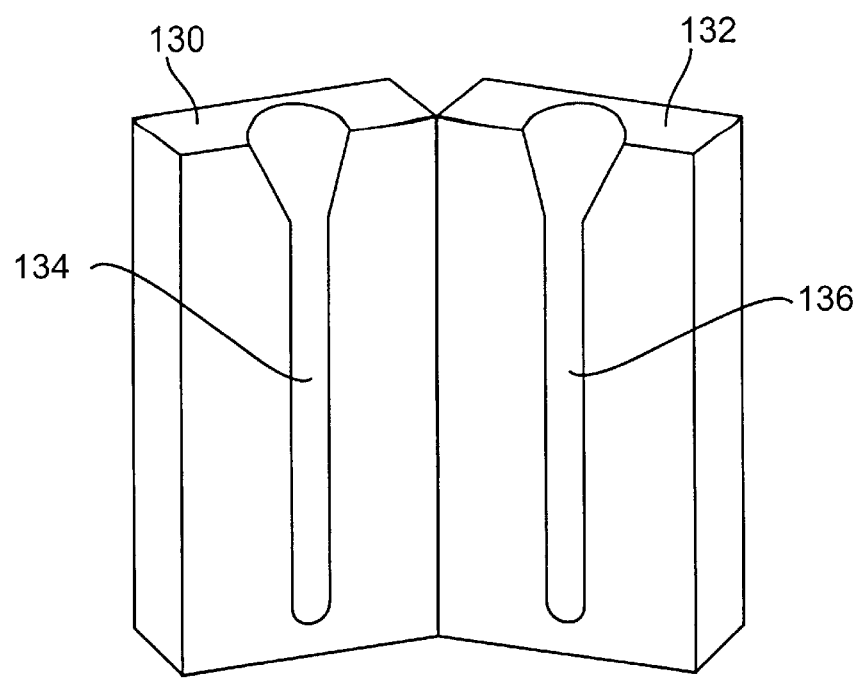
FIG. 9 is a perspective view of vein or artery mold halves prior to insertion of the mandrel an assembly of the halves.
Figure 10:
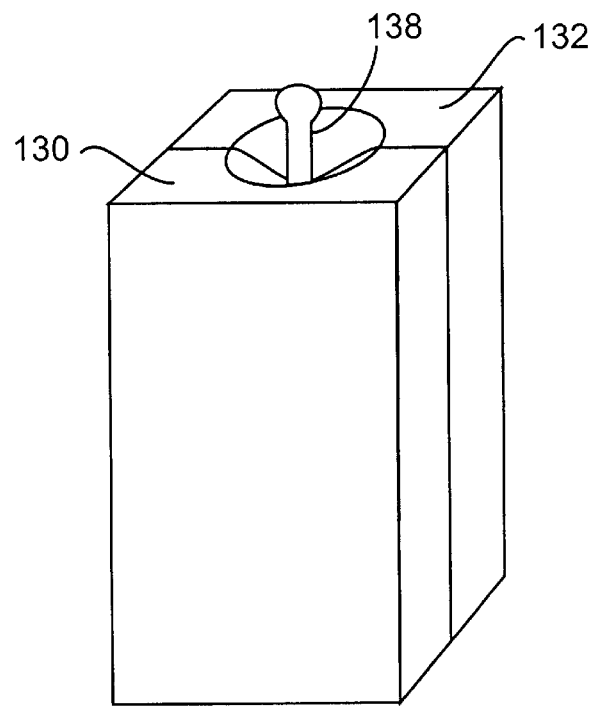
FIG. 10 is a perspective view of the mold halves of FIG. 9 after assembly, with the mandrel inserted inside the mold.
Figure 11:
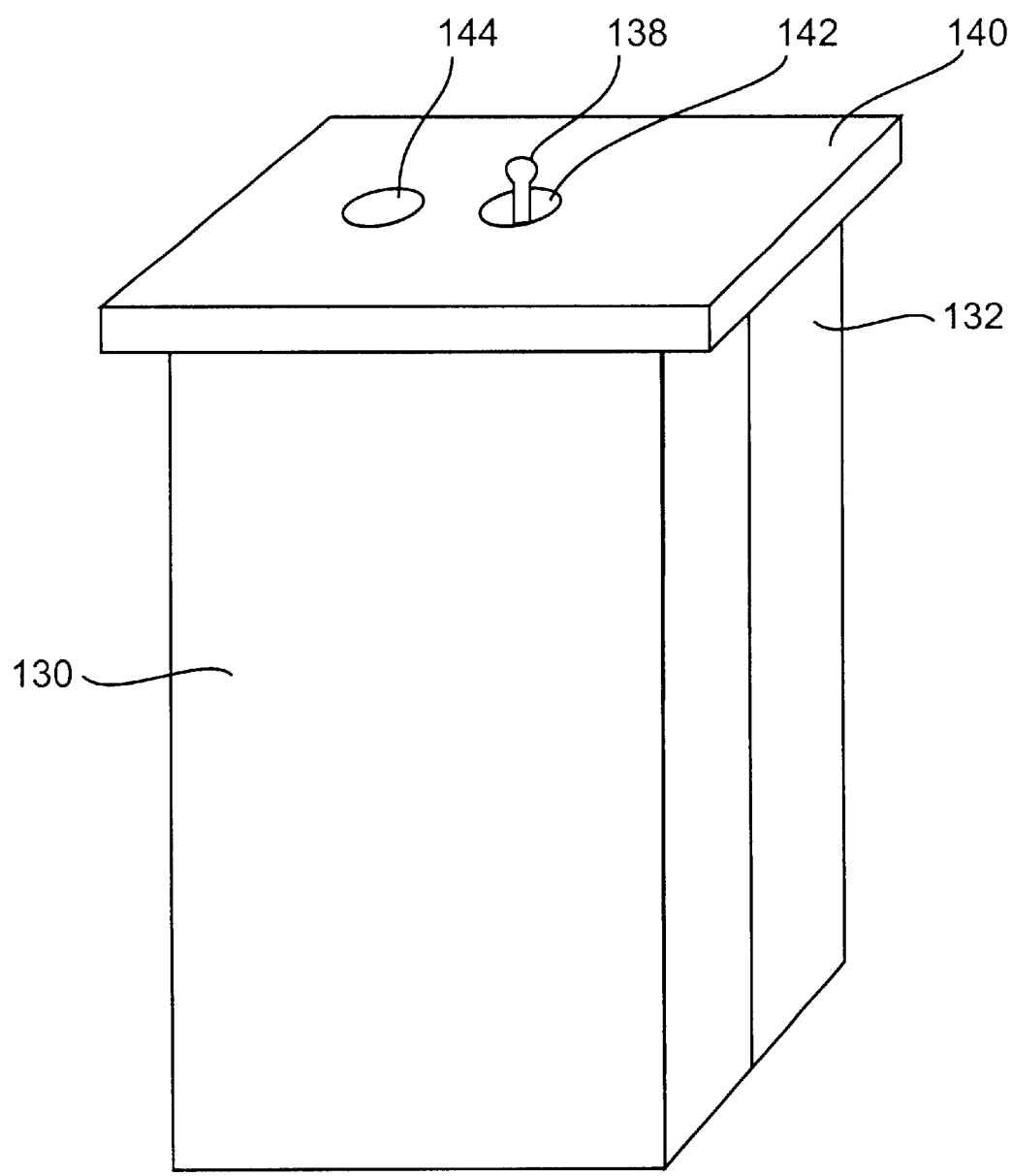
FIG. 11 is a perspective view of the mold halves of FIG. 10 after assembly, with a cap placed on top of the mold halves.

The next step is the production of the actual jugular vein and carotid artery. The silicone (or other desired material) must be sufficiently mixed. A diluent can be added if needed. The silicone should be de-gassed by placing the silicone in a vacuum chamber for approximately fifteen minutes. The silicone should be examined to ensure that all gas bubbles have evolved and dissipated. The silicone is then removed from the vacuum chamber. Molds are now constructed for the jugular vein and carotid artery. As shown in FIG. 9, the mold for the jugular vein or carotid artery comprises mold halves 130 and 132 with cavities 134 and 136, respectively. The appropriate mandrel of castable alloy produced in the previous step is now placed in the cavity and the mold halves are closed as shown in FIG. 10. FIG. 10 shows the closed mold with the mandrel 138 projecting from the top of the mold. The mold is secured by fasteners such as rubber bands. As shown in FIG. 11, a cap 140 is placed on the top of the mold, with the mandrel 138 being guided through a location hole 142. The cap 140 also has a hole 144 adjacent the location hole 142. The degassed silicone is now slowly poured into the hole 144 in the cap. The silicone subsequently fills the cavities 134 and 136 in the mold halves 130 and 132. The silicone must be allowed to set for a period of time, preferably at least 24 hours.

Once the silicone is set, cap 140 can be removed and the mold halves 130 and 132 can be disassembled and the vein or artery can be removed. The mandrel is still located within the vein or artery. The next step is the process of removing the mandrel from the inside of the silicone vein or artery. This process takes several steps. First, the vein or artery with the mandrel inside is suspended in an oven with a petri dish underneath. The oven is then heated to a temperature slightly above the melting temperature of the mandrel casting alloy. The mandrel alloy is then allowed to melt and drip from the inside of the vein or artery for a sufficient amount of time, typically about one hour. The vein or artery can then be removed from the oven and allowed to cool. Once the vein or artery is cooled, any remaining casting alloy should be removed from the inside of the vein or artery, and the vein or artery should be cleaned and trimmed. The veins and arteries are now ready for insertion into the neck model.

The artificial muscle tissue, fat tissue, vertebrae and trachea are also designed to be similar to the properties of an actual child. Based on extensive research, the modulus of elasticity for the various parts of the human neck were calculated to be as follows: Jugular Veins=18 psi; Carotid Artery=32 psi; Cervical Vertebrae (spine)=50,000 psi; Trachea=2200 psi; Muscle Tissue=18–25 psi; Fat Tissue=less than 18 psi; and Esophagus=6 psi. Based on these values, the appropriate materials were selected for each of the parts above.

The majority of the neck components were made using castable silicone. For example, the jugular veins, carotid arteries, muscle tissue, and fat tissue were all made using silicone V-1068. The appropriate elastic modulus for each component was achieved by adding diluent to the silicone. The appropriate amount of diluent can be calculated based on the graph on FIG. 6. For example, the fatty tissue will have a lower modulus of elasticity than the muscle tissue, and therefore, more diluent will be added to the silicone to form the fatty tissue. Other components with higher modulus of elasticity, such as the vertebrae, were made out of polyurethane with a high modulus of elasticity. For example, the cervical vertebrae was created using BERMAN INDUSTRIES BJB-TC881 2 part castable polyurethane. It should be understood that other types of polyurethane and materials may be used. The trachea was created using TYGON brand laboratory tubing with an inside diameter of ¼" and outside diameter of ⅜ inch. The skin layer was created using MCMASTER-CARR SUPER STRETCH silicone.

The muscle tissue, trachea, and cervical vertebrae are molded separately and then combined by molding them inside fat tissue. The carotid sheaths are left void so that the jugular veins and carotid arteries can be inserted into the neck model.

In addition to components of the neck, the other portions of the apparatus must have physical characteristics resembling the body of a child. For example, the pump 114 must be sized to correspond to the total blood flow required, as well as the beats per minute of a heart of a typical child. Based on a carotid artery flow rate of 510 ml/minute for each carotid artery, the total head flow rate will be 1,020 ml/minute. Assuming that 50% of the blood goes to the head, a pump having at least 2,040 ml/minute flow rate is required. It should be understood that these numbers are exemplary only.

Figure 12:
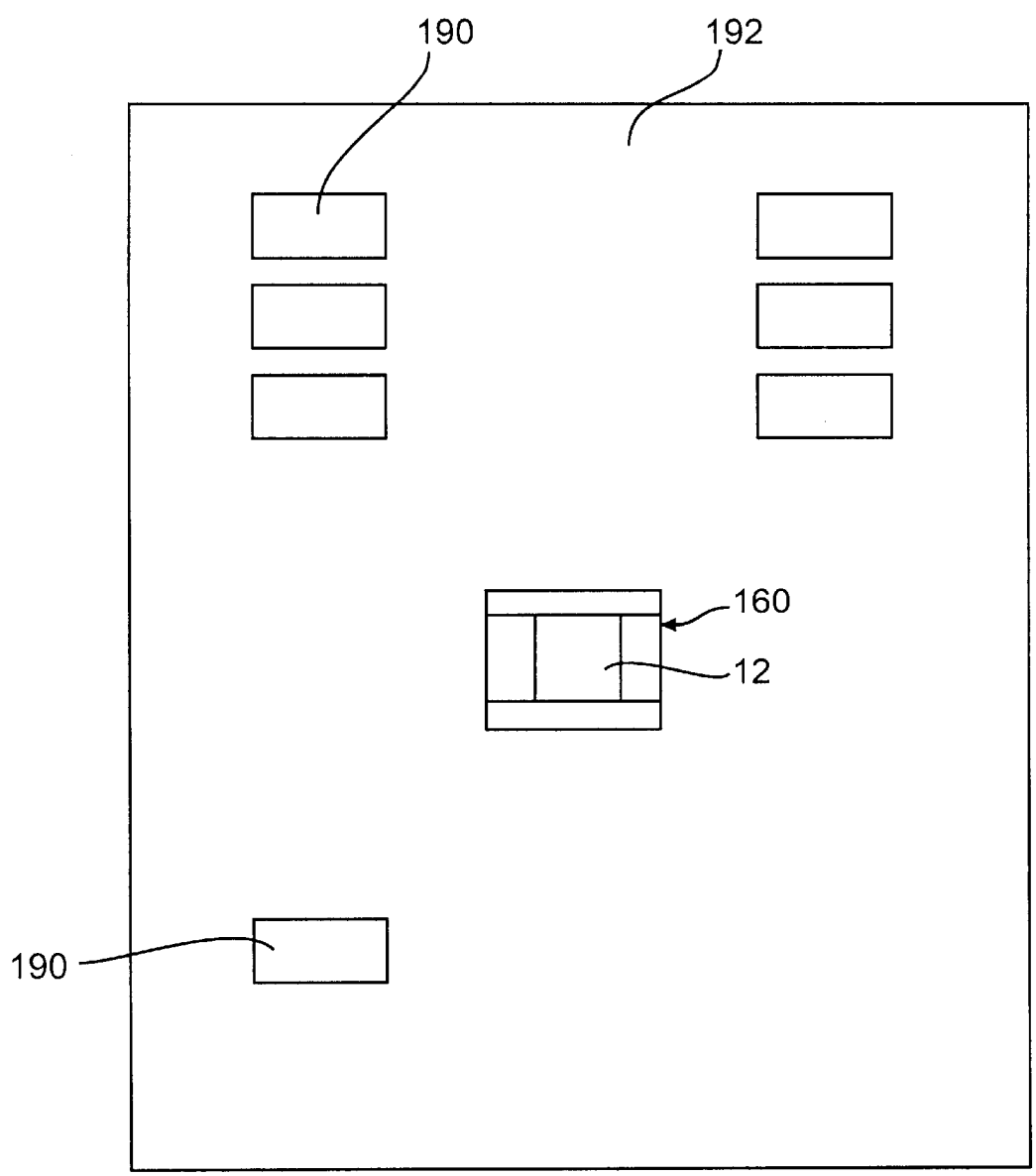
FIG. 12 is a front view of the apparatus mounted on a box-like structure.

The apparatus is assembled into a single unit for ease of operation. As shown for example in FIG. 12, digital displays 190 for the flow meters and pressure sensors can be located in an easily visible location on the outside of a box-like structure 192. In this manner, the important data can be viewed by an operator in one location. The neck 12 and support frame are positioned on the front of the box-like structure 192 so that the operator has easy access to the neck for testing.

Figure 13:
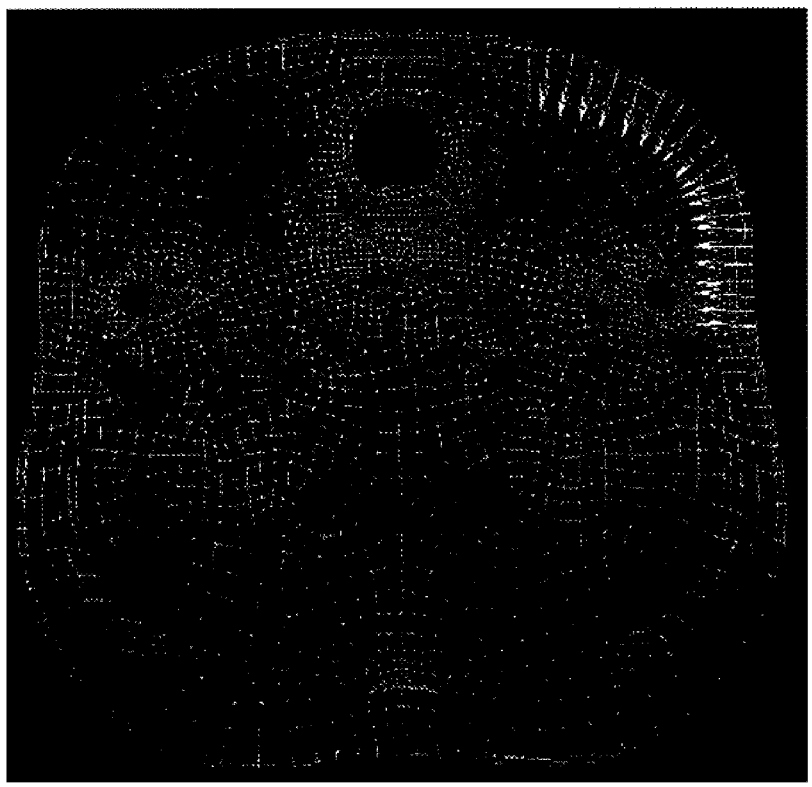
FIGS. 13–15 are computer models of a child's neck.
Figure 14:
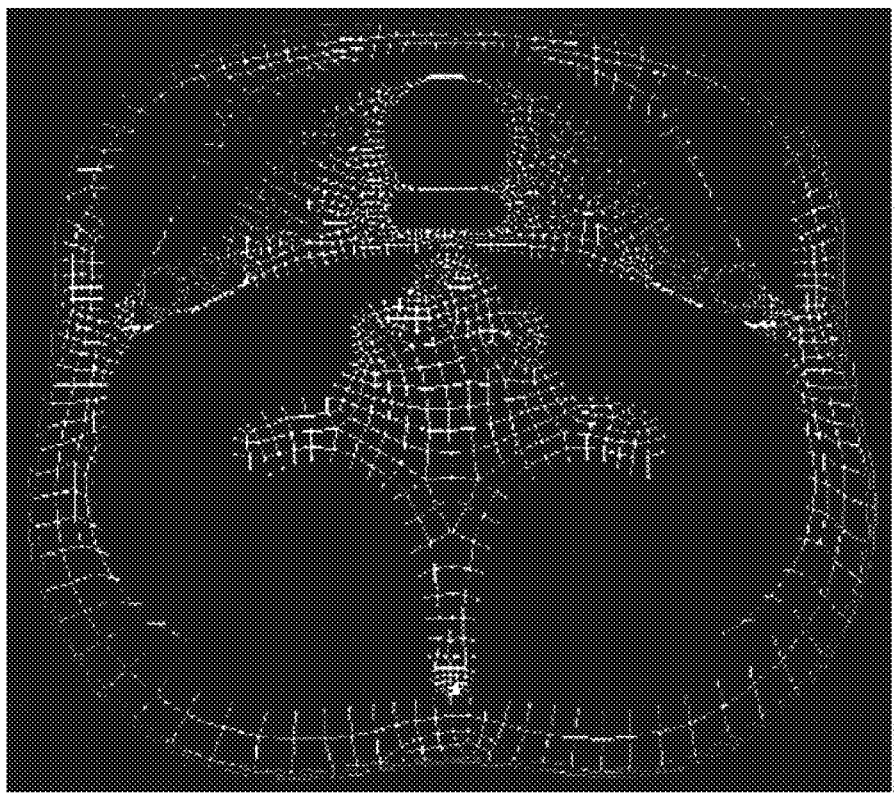
Figure 15:
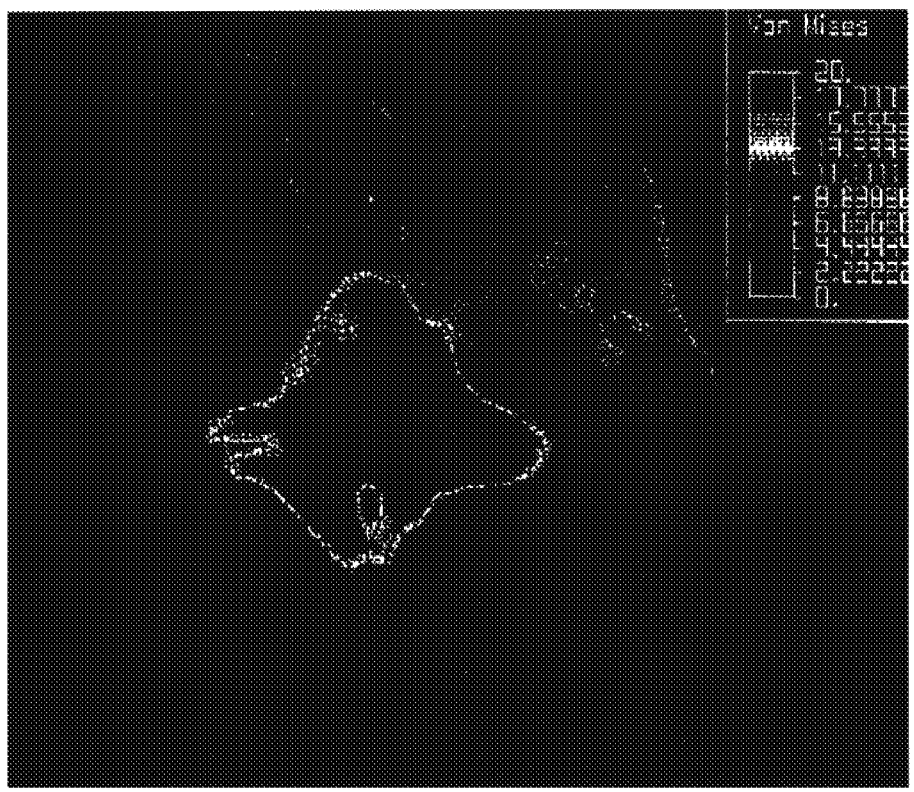

Computer models, such as those shown in FIGS. 13–15 using Finite Element Analysis, can be utilized in order to design the mechanical model, in addition to doing computerized strangulation modeling. A computer model is very flexible and can be adjusted to simulate different types of strangulation for children of different ages. The computer model can be used to study the physical response of the neck when undergoing almost any conceivable strangulation situation. The computer model will also be very useful for assessing the design of products and apparel before they are manufactured.

A second embodiment of the invention will now be described wherein like or similar parts are identified throughout the drawings by the same reference characters. The second embodiment is directed toward an apparatus for measuring the effect of strangulation where the strangulation occurs as a result of an interruption of air supply. This is referred to as suspension strangulation. This second embodiment is in contrast to the first embodiment which was directed at strangulation as a result of interruption of blood supply, also called ligature strangulation.

Suspension strangulation occurs due to a child being placed in a position where the child is hanging from an object with a force imparted on the neck. Alternately, suspension strangulation can occur due to any other type of force being imparted on a child's neck. The imparted force closes off the airway, resulting in suspension strangulation.

In accordance with the second embodiment of the present invention, an apparatus for measuring the effect of strangulation is provided. The apparatus comprises a model of a human having an artificial neck, a closed tube, and a pressure sensor to measure the pressure of the air in the closed tube. The apparatus further includes a flexible artificial spine, artificial muscle tissue surrounding the artificial spine, and artificial fat tissue surrounding the closed tube.

Figure 16:
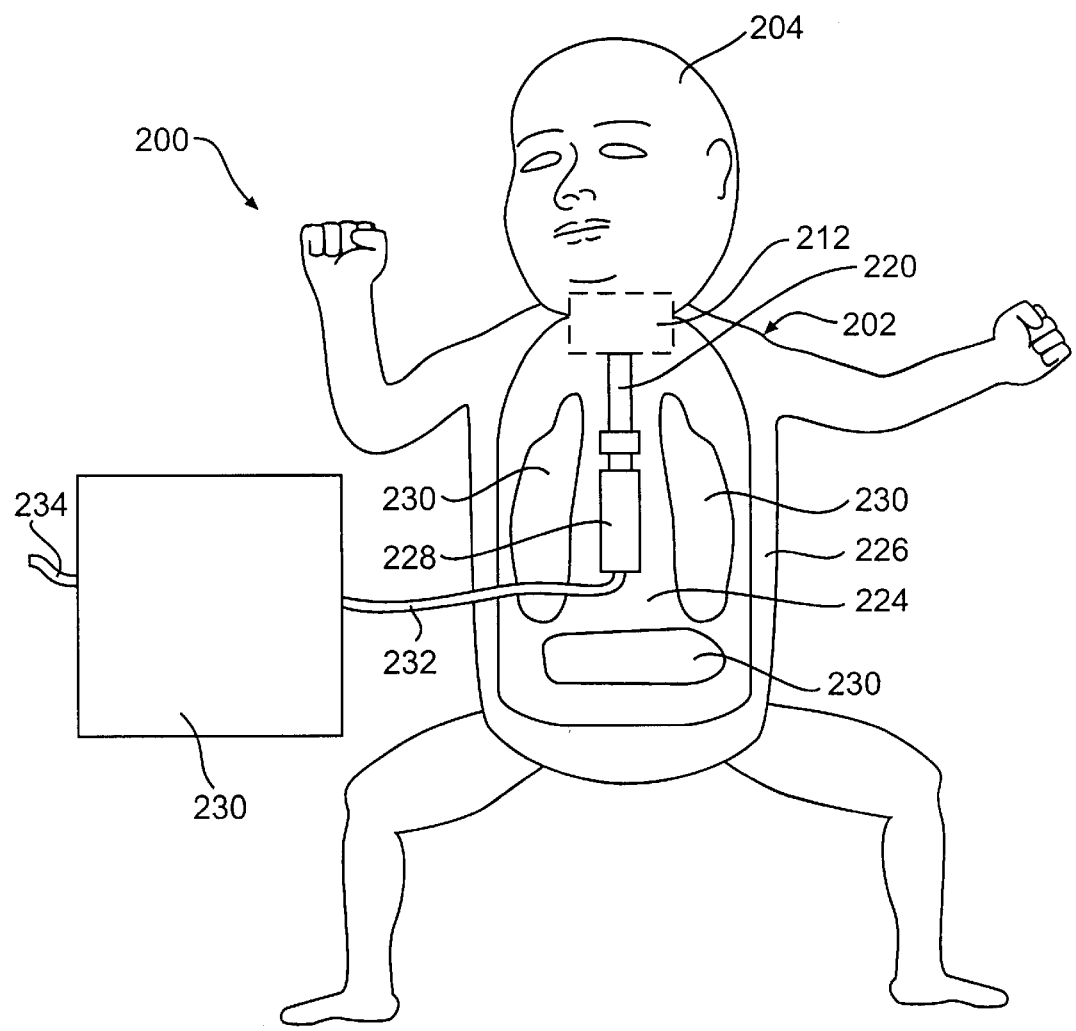
FIG. 16 is a perspective view of an apparatus for measuring the effect of strangulation on a model of a child according to a second embodiment of the invention.
Figure 17:
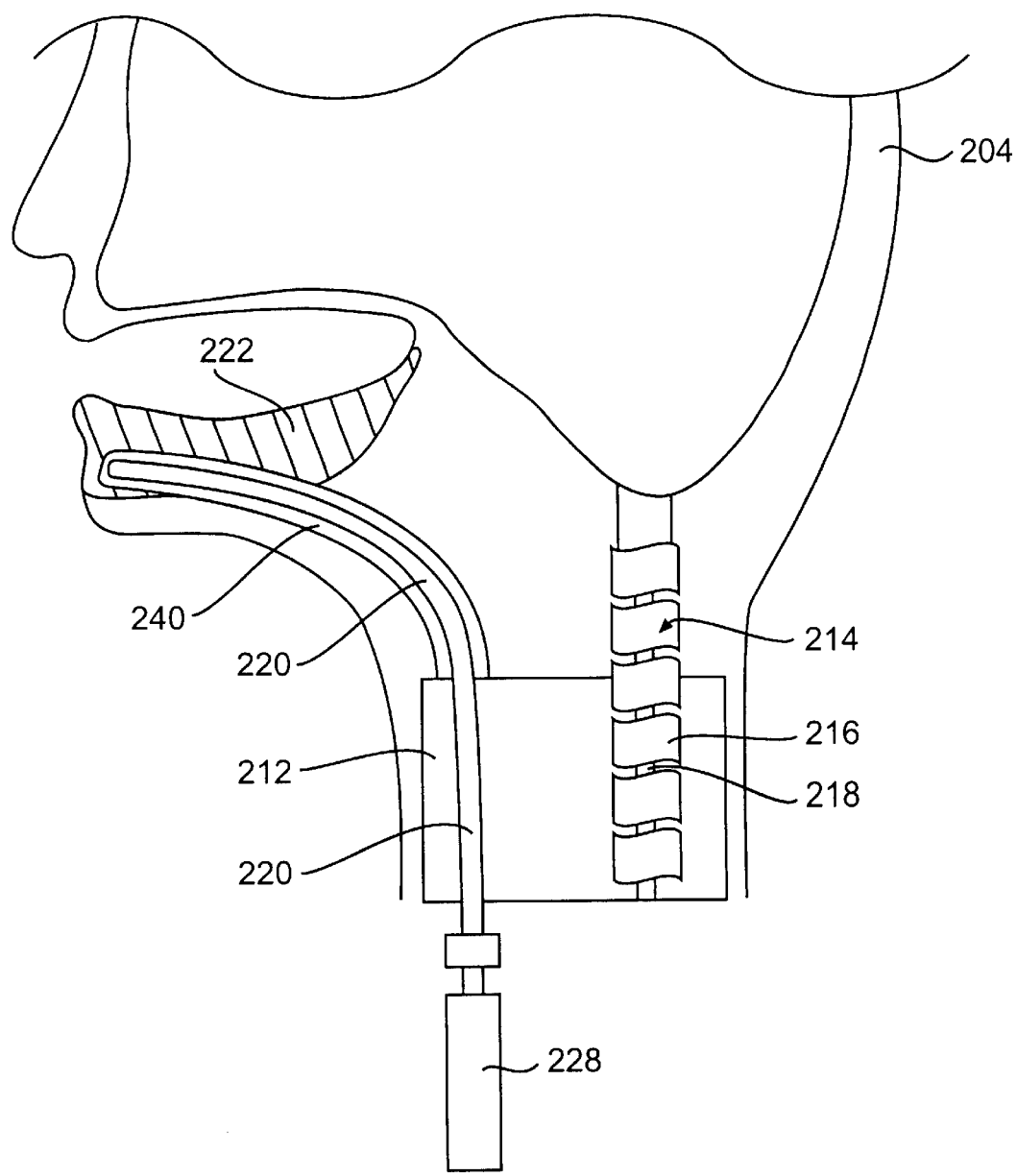
FIG. 17 is a sectional view of the head of a model of a child according to the second embodiment of the invention.

As embodied herein and shown in FIGS. 16–17, apparatus 200 includes a model of a human 202 having an artificial neck portion 212. The artificial neck portion 212 is similar to the artificial neck portion in the ligature strangulation embodiment but does not contain jugular veins or arteries. The artificial neck portion includes artificial spine 214 as shown in FIG. 17. Unlike the artificial spine in the ligature strangulation embodiment, the artificial spine 214 in the suspension embodiment is flexible. The artificial spine 214 is flexible due to spinal segments 216 that are connected by a spring 218. The spinal segments are preferably made out of cast polyuerethane. The remainder of the neck 212 is essentially identical to the neck described in the first embodiment.

The model further includes a closed tube 220 which passes through the neck portion 212. The closed tube 212 extends from the jawbone 222 downward through the neck 212, passing into the body cavity 224 of the body portion 226. The closed tube can be made out of a variety of materials. In the preferred embodiment, the closed tube is a section of Tygon flexible tubing. In the portion of the model's head 204 above the neck portion 212, the closed tube is surrounded by artificial fat tissue 240 as shown in FIG. 17.

The apparatus further includes a pressure sensor 228 to measure the pressure of the air in closed tube 220. Pressure sensor 228 is preferably a pressure transducer. Pressure sensor 228 is attached to the end of the closed tube 220 as shown in FIGS. 16–17. The pressure sensor 228 is connected to a digital meter 230 via connection 232. The digital meter 230 displays the pressure reading, and also transmits data to a computer via connection 234. The computer, not shown, records and analyzes the data.

The construction of the model 202 will be described below. The model is designed to closely simulate the size and weight of an ordinary 18 month old child. The model shown in FIG. 16 is a modified cardiopulmonary resuscitation (CPR) training mannequin. Weights 230 are added in order to raise the weight of the model to approximately 16 pounds, the average weight of an 18 month old child. The head 204 of the model is modified by inserting the closed tube 220 and fat tissue 240 surrounding the closed tube. The closed tube 220 is inserted through the neck portion 212 of the head 204. The artificial spine 214 is positioned to extend through the neck portion.

The operation of the apparatus of the second embodiment of the present invention will now be described. The model is placed in a position so that a force is applied to the neck portion. As previously discussed, this can be a position where the model is hanging from an object, or a position where any other type of force is imparted on the neck portion. When a force is imparted on the neck portion, the pressure of the air on the inside of the closed tube 220 will increase. The pressure sensor 228 located at the end of the closed tube measures the air pressure inside the closed tube.

In order for the air pressure measurement to be useful, the model must first be calibrated. Previous studies have been performed by doctors in order to measure the threshold amount of force on the neck which is required to cause suspension strangulation by the closing of the airway. When this threshold amount of force is imparted on the model, a threshold air pressure can be measured. This threshold air pressure corresponds to the force required to cause suspension strangulation. Therefore, if the measured air pressure is less than the threshold air pressure, suspension strangulation has not occurred. If the measured air pressure is greater than the threshold air pressure, suspension strangulation has occurred. In this manner, it is easy to tell whether or not suspension strangulation will be caused by a given product or apparel.

In addition, the relationship between the applied force and the measured air pressure for a range of applied forces can also be calculated. This relationship can be established by imparting forces on the neck in one pound increments while measuring the air pressure on the closed tube at each force increment. This should be performed for the full range of imparted forces from zero to well above the force required to cause suspension strangulation. In this manner, for any given measured air pressure, the imparted force can be calculated by reading from a graph of the imparted force vs. the closed tube air pressure.

A large variety of products and apparel can be tested with the suspension strangulation apparatus. This allows manufacturers to design products and apparel that pose a decreased strangulation hazard.

It will be apparent to those skilled in the art that various modifications and variations can be made in the apparatus and method for measuring the effect of strangulation, method of manufacturing an artificial human neck, use of the apparatus of the present invention, and in construction of this apparatus, without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for measuring the effect of strangulation, comprising:

a model of a human having a neck portion, the neck portion including embedded therein a model of a human life support system; and at least one sensor for measuring physical characteristics of the neck portion during application of a strangulation force on the neck portion.

2. The apparatus of claim 1, wherein said life support system further comprises a respiratory system including a closed tube, and wherein said at least one sensor includes a pressure sensor to measure a pressure of air in the closed tube.

3. The apparatus of claim 2, wherein said pressure sensor comprises a pressure transducer.

4. The apparatus of claim 2, wherein said artificial neck includes an artificial spine.

5. The apparatus of claim 4, wherein said artificial spine is flexible.

6. The apparatus of claim 4, wherein said neck further includes artificial muscle tissue surrounding the artificial spine and artificial fat tissue surrounding the closed tube.

7. The apparatus of claim 2, wherein said pressure measured by the pressure sensor in the closed tube is representative of the applied force on the artificial neck.

8. An apparatus for measuring the effect of strangulation comprising:
   a model of a human having a neck portion, the neck portion including embedded therein a model of a human life support system; and
   at least one sensor for measuring physical characteristics of the neck portion during application of a strangulation force on the neck portion;
   wherein said life support system includes a circulation system for circulating a fluid, and wherein said at least one sensor includes a flow sensor to measure a flow of the fluid in the circulation system at a predetermined location and a pressure sensor to measure a pressure of the fluid in the circulation system at a predetermined location.

9. The apparatus of claim 8, wherein said circulation system includes a pump for circulating the fluid through the circulation system, tubing for carrying the fluid, and a reservoir for storing and providing said fluid to the pump.

10. The apparatus of claim 9, wherein said artificial neck includes two artificial carotid arteries and two artificial jugular veins.

11. The apparatus of claim 10, wherein said artificial neck further includes an artificial spine, artificial muscle tissue surrounding the artificial spine, an artificial trachea, and artificial fat tissue surrounding the artificial trachea.

12. The apparatus of claim 10, wherein said artificial carotid arteries and artificial jugular veins are comprised of silicone.

13. The apparatus of claim 8, further comprising a plurality of flow valves for regulating the amount of fluid circulating through the circulation system.

14. A method for measuring the effect of strangulation on a model of a human, comprising the steps of:
   imparting an applied force on a neck portion of the model of a human; and
   measuring the physical characteristics of the neck portion during the application of the applied force on the neck portion.

15. The method of claim 14, further comprising, prior to the step of imparting an applied force, the step of pumping a fluid through a circulation system including at least the neck portion of the model of a human.

16. The method of claim 15, wherein the step of measuring the physical characteristics of the neck portion includes measuring a pressure and flow of the fluid in the neck portion during application of the applied force.

17. The method of claim 15, further comprising measuring the pressure and flow of the fluid at predetermined locations of the circulation system during application of the applied force.

18. The method of claim 14, wherein the step of measuring the physical characteristics of the neck portion includes measuring a pressure of the air in a closed tube in the neck portion during application of the applied force on the neck portion.

19. The method of claim 18, further comprising the step of calculating whether strangulation has occurred, based on whether the measured pressure has reached a pressure corresponding to a force sufficient to cause strangulation.

* * * * *